United States Patent
Rigsby

[11] 4,051,327
[45] Sept. 27, 1977

[54] TELEPHONE ALARM SYSTEM
[75] Inventor: Jesse H. Rigsby, Clarksville, Tenn.
[73] Assignee: Pan-X Corporation, Indian Mound, Tenn.
[21] Appl. No.: 681,834
[22] Filed: Apr. 30, 1976
[51] Int. Cl.² ........................................... H04M 11/04
[52] U.S. Cl. .................................. 179/5 R; 179/2 A
[58] Field of Search .......... 179/5 R, 5 P, 2 A, 2 DP, 179/90 B, 84 VF

[56] References Cited
U.S. PATENT DOCUMENTS

| | | | |
|---|---|---|---|
| 3,233,232 | 2/1966 | Brennon | 179/5 R |
| 3,702,902 | 11/1972 | Willis | 179/5 R |
| 3,842,208 | 10/1974 | Paraskevakos | 179/5 R |

Primary Examiner—Thomas A. Robinson
Attorney, Agent, or Firm—Neuman, Williams, Anderson & Olson

[57] ABSTRACT

A telephone alarm system is provided including transmitter and receiver units for interconnection through telephone lines and exchange circuits. In response to an alarm signal, a line circuit in the transmitter unit is operated to an on-line condition and upon receipt of dial tone, a dialing circuit is operated to signal the exchange circuits to apply a ring signal to the receiver unit which responds to establish a completed connection. A request data tone signal is then transmitted from the receiver unit to the transmitter unit and in response, the transmitter unit transmits frequency shift keying signals generated from serial trains of pulses developed by a converter circuit which is controlled from parallel connections to a plurality of output lines of a memory circuit. The memory circuit stores coded word information which uniquely identifies the transmitter unit and also stores information as to the telephone number of the receiver unit. The dialing circuit is also controlled from the memory circuit and includes a counter which counts clock pulses according to bit information supplied in parallel word groups from the memory. The receiver unit responds to the frequency shift keying signals to develop serial trains of pulses which are applied to a converter circuit operative to develop signals applied in parallel to a teleprinter or the like to display the code work unique to the transmitter unit. Circuits are provided in the units for performing various functions including redialing if no dial tone is detected, re-transmission of the data request tone signal if a parity check in the receiver unit is not satisfactory, re-transmission of data and for causing each unit to go off-line after a predetermined time interval.

22 Claims, 23 Drawing Figures

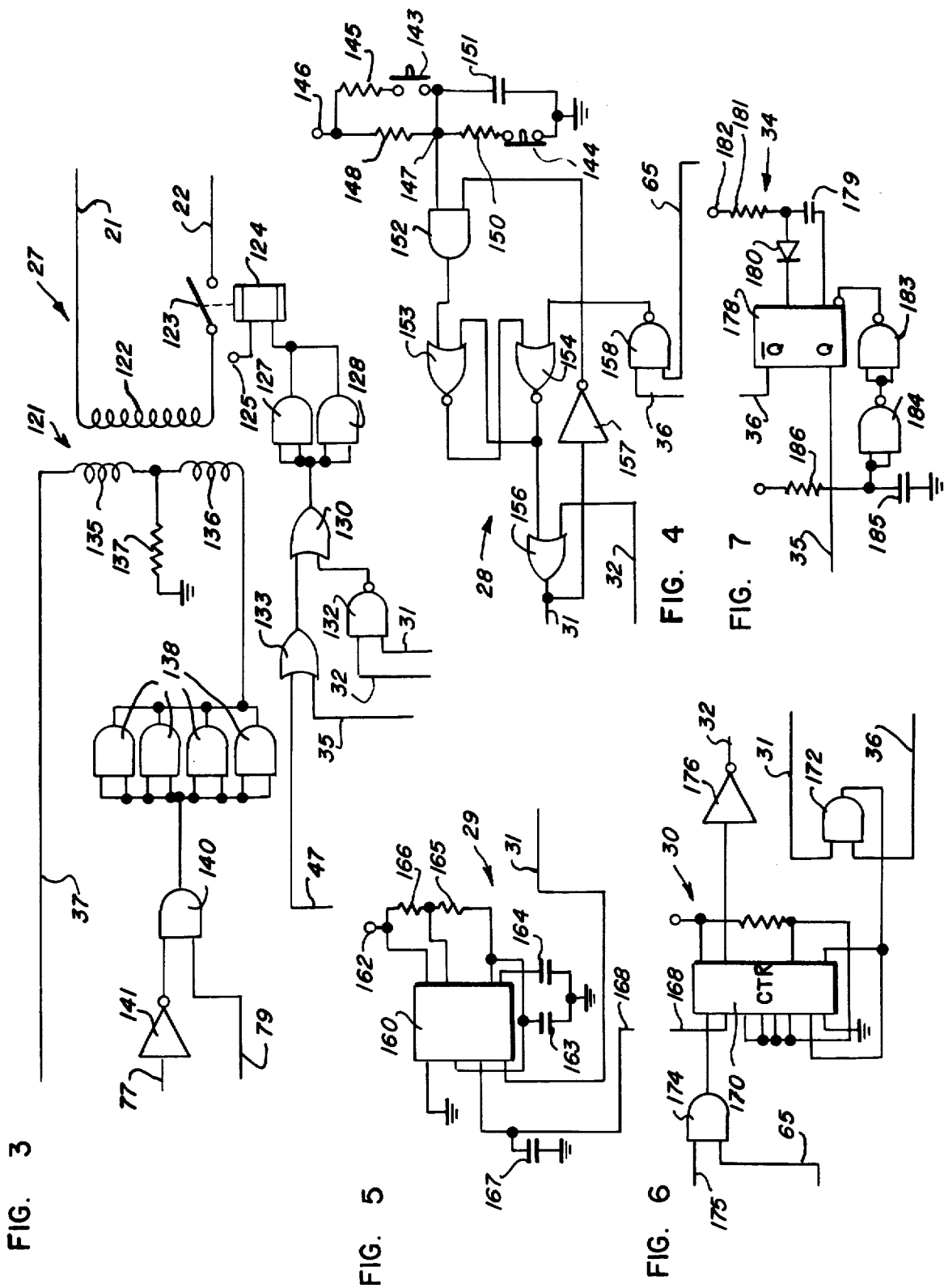

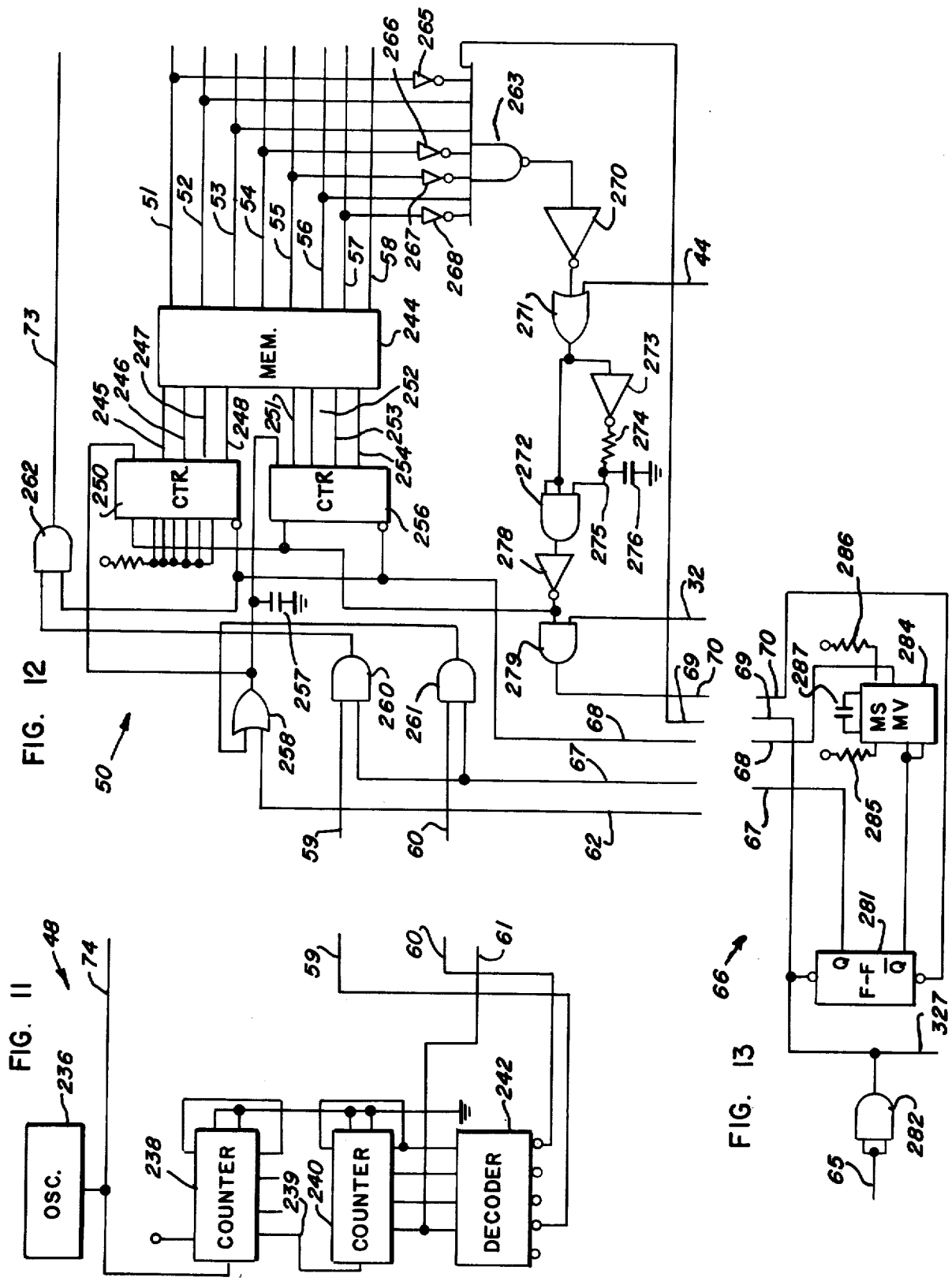

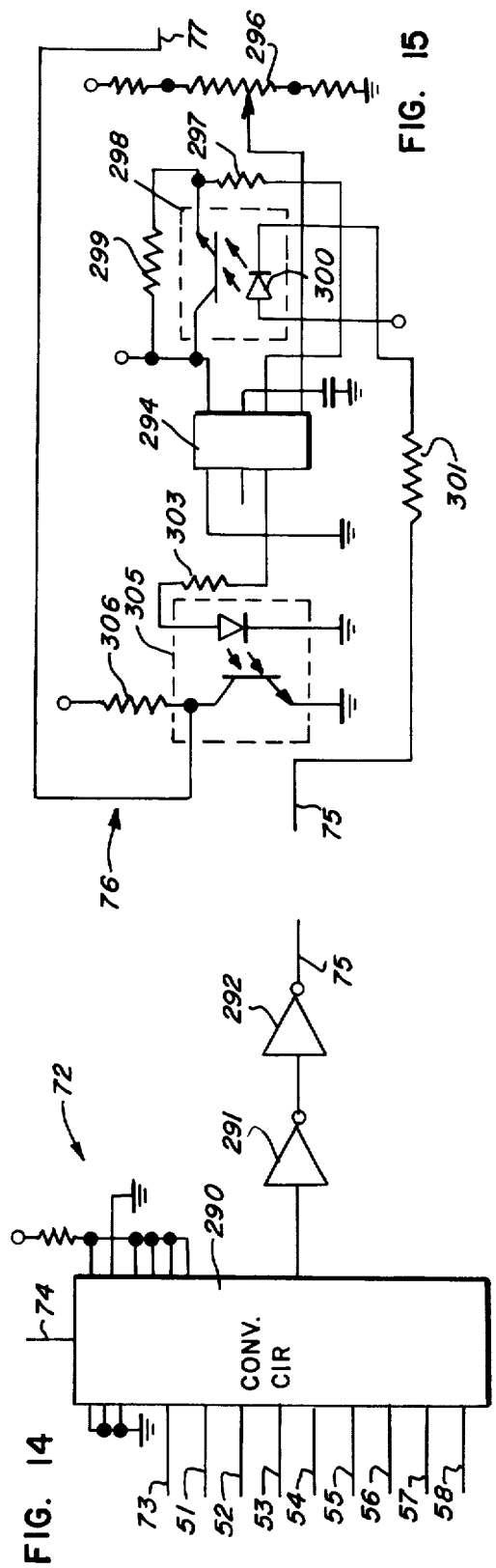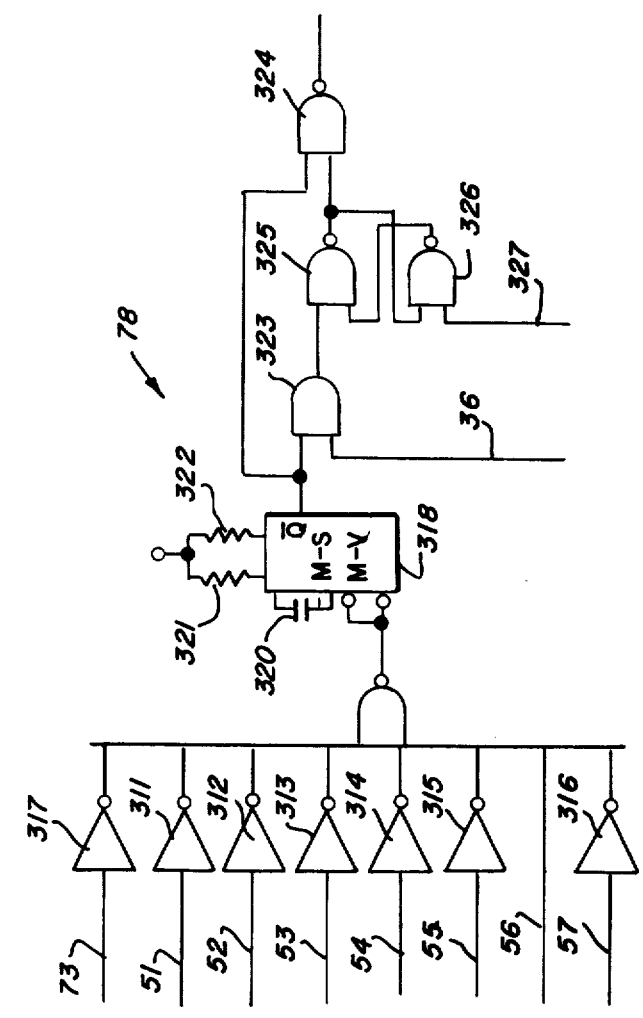

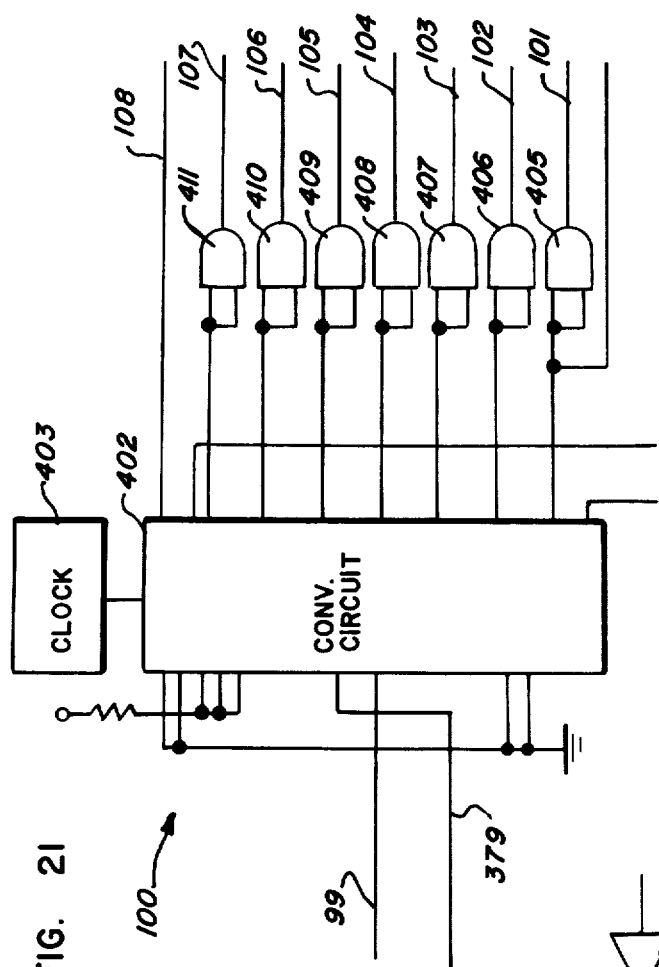
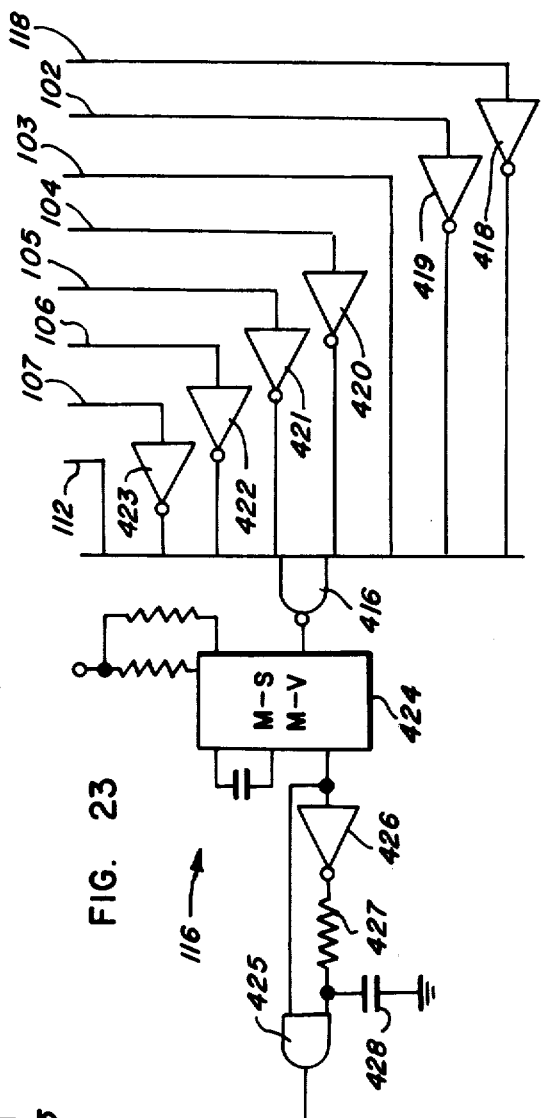
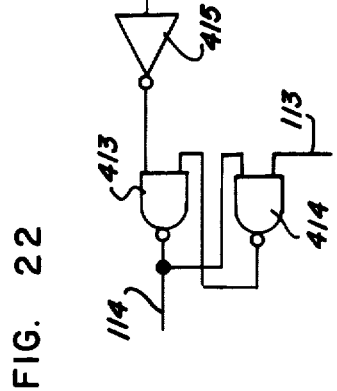
FIG. 21
FIG. 22
FIG. 23

TELEPHONE ALARM SYSTEM

This invention relates to a telephone alarm system and more particularly to a telephone alarm system which provides a high degree of security against interference with its operation by unauthorized persons and which is otherwise operative to transmit alarm signals with a high degree of reliability. The system can be easily installed and put into operation and its construction is such that it is economically manufacturable, using standard available components.

BACKGROUND OF THE INVENTION

Various systems have heretofore been proposed for using telephone lines to transmit alarm signals from a transmitter unit in a home, office, school, factory or the like to a receiver unit in a fire, police or security office. In a number of such systems, the transmitter unit includes dialing apparatus operated in response to an alarm condition for dialing a telephone number assigned to a receiver unit and establishing a connection thereto through the telephone lines and telephone exchange circuits. In addition, such systems have included apparatus for transmitting data through the connection thus established. Some of such proposed systems would not provide proper security against the possibility of interference with their proper operation by unauthorized persons. For example, systems have been proposed in which the data is transmitted in a format such that it would be quite easy for an unauthorized person to "jam" the system by providing apparatus for transmitting signals to the receiver unit to tie it up and make it impossible to determine whether an alarm condition existed at the location of any particular transmitter unit.

Other types of systems have been so complex as to have questionable reliability as well as being difficult and expensive to manufacture. For example, systems have been proposed using multiple transmissions back and forth between transmitter and receiver units and other systems have been proposed using random signal generators.

The construction and operation of the prior-proposed systems has otherwise left much to be desired. Arrangements for dialing or for storing or determining information to be transmitted have been cumbersome and have included, for example, switches operated by motor-driven cams, magnetic tape arrangements, complex arrangements of multivibrators, counters and gates or pulse transformers in a matrix arrangement, multiplex switches operated from a clock circuit and memories controlled from a plurality of counter circuits.

Also, many of these systems have been deficient in that they can be rendered ineffective if no dial tone is received from the telephone exchange circuits or if a busy signal is sent back, or if there is outside interference at the time of transmission of data.

SUMMARY OF THE INVENTION

This invention was evolved with the general object of overcoming the disadvantages of prior systems and of providing a system which provides a high degree of security against unauthorized interference with its operation and which is otherwise highly reliable while being economically manufacturable and such that it can be readily installed and operated.

In a system constructed in accordance with the invention, a transmitter unit is provided including a line circuit for establishing a low impedance connection between telephone lines connected thereto and for receiving a dial tone signal back from the telephone exchange system. In response to receipt of a dial tone signal, dial signals are transmitted through the telephone lines to the exchange system which normally responds by sending a ring signal to the receiver unit, the receiver unit including a line circuit for responding by establishing a connection to the lines connected thereto and to thereby complete a connection between the transmitter and receiver units. The receiver unit transmits a request data tone signal which is detected by detector means in the transmitter unit.

The transmitter unit includes a memory for storing a code word unique to the transmitter unit and code signal transmission means controlled from the request data tone detector and from the memory for transmitting keyed signals to the receiver unit. The receiver unit is arranged to respond to the transmitted keyed signals to develop output signals which are applied to display means such as a teleprinter to display the code word which is unique to the transmitter unit. Thus a person in the fire, police or security office can take appropriate measures to respond to the alarm condition. Through the use of the code word stored in the memory of the transmitter unit, it is possible to prevent interference with the operation of the system by unauthorized persons, since the identity of the code word can be restricted to highly trustworthy personnel.

Important features of the invention relate to the memory circuit, to the control of signal transmission means from the memory circuit and to the use of the memory circuit in control of both dialing and data transmission. The memory circuit is operative to store coded word information in the form of a plurality of word groups each including a plurality of bits and it has a plurality of output terminals on which signal voltages are simultaneously developed corresponding to the bits of each word group. For data transmission, a converter circuit is provided having input terminals coupled to a clock circuit and to the memory circuit output terminals, the converter circuit being arranged to develop serial trains of pulses with the number of pulses in each train corresponding to signal voltages simultaneously developed on the output terminals of the memory circuit. Address means are coupled to the clock circuit and to the memory circuit for successively developing signal voltages on the memory circuit corresponding to successive word groups of stored information and strobe means control operation of the converter circuit in timed relation to the operation of the address means. A keying circuit operates in response to the trains of pulses, the keying circuit being preferably operative to develop signals shifted between two tones of different frequencies.

For dialing control, the memory also stores word groups corresponding to digits of a telephone number assigned to the receiver unit and dialing means are controlled from the output lines corresponding to such word groups. Preferably, the dialing means includes counter means responsive to low frequency clock signals from the clock circuit and coupled to the memory circuit output terminals for counting until the number of pulses applied corresponds to a word group of information presented, the clock pulses so counted being applied through the line circuit to the telephone lines, as by operation of a line relay. Address counters control the memory to present successive word groups and when an end of data code signal is produced, the memory is reset and a dialing control latch circuit is placed in an initial unlatched condition.

Another important feature is in the provision in the receiver unit of a converter circuit for converting serial trains of pulses into parallel output signals which are clocked to a teleprinter or other display means. The receiver unit includes a parity latch circuit operative in conjunction with other circuits to provide for re-transmission of a request data tone and re-transmission of the data signals in the event an error is detected. Otherwise, no re-transmission is required and after operation of timing circuitry, both units go off-line.

The arrangement is such as to minimize the complexity of the generation of signals while at the same time providing a high degree of security against unauthorized interference. The code word is inserted into the memory at the time of purchase or installation of the transmitter unit and can be known only to authorized personnel. Even if an outsider tries to foil the system by transmitting a bogus code word, it can be quickly detected from observation of the code word which is printed out, especially if it is repeated, and measures can be taken to trace the source and take appropriate action.

Additional features relate to the provision of timing and latch circuits, including an enable latch circuit operated in response to an alarm signal, an on-line loop circuit and dialing and request data latch circuits. Automatic redialing is performed if no dial tone is detected, data is re-transmitted if the parity check in the receiver unit is not satisfactory and if all operations are satisfactorily performed, the transmitter unit goes off-line after a predetermined time interval. Preferably, the on-line loop circuit includes a counter operated from clock signals supplied from an on-line clock circuit. The receiver unit also includes timing circuits for the proper timed operation of the circuits therein and for going off-line after a predetermined time interval.

The required circuits are of standard available integrated circuit types which are highly reliable in operation and because of their solid state construction with no mechanical parts other than a line relay, both the transmitter and receiver units are of small physical size.

This invention contemplates other objects, advantages and features which will become more fully apparent from the following detailed description taken in conjunction with the accompanying drawings.

BRIEF DESCRIPTION OF THE DRAWINGS

FIG. 3 is a circuit diagram of a line circuit of the transmitter unit of FIG. 1;

FIG. 4 is a circuit diagram of an enable latch circuit of the transmitter unit of FIG. 1;

FIG. 5 is a circuit diagram of an on-line clock circuit of the transmitter unit of FIG. 1;

FIG. 6 is a circuit diagram of an on-line loop circuit of the transmitter unit of FIG. 1;

FIG. 7 is a circuit diagram of a power-up circuit of the transmitter unit of FIG. 1;

FIG. 11 is a circuit diagram of a clock circuit of the transmitter unit of FIG. 1;

FIG. 12 is a circuit diagram of a memory circuit of the transmitter unit of FIG. 1;

FIG. 13 is a circuit diagram of a request data latch circuit of the transmitter unit of FIG. 1;

FIG. 14 is a circuit diagram of a converter circuit of the transmitter unit of FIG. 1;

FIG. 15 is a circuit diagram of a keying circuit of the transmitter unit of FIG. 1;

FIG. 16 is a circuit diagram of an end of transmission circuit of the transmitter unit of FIG. 1;

FIG. 21 is a circuit diagram of a converter circuit of the receiver unit of FIG. 2;

FIG. 22 is a circuit diagram of a parity latch circuit of the receiver unit of FIG. 2; and FIG. 23 is a circuit diagram of an end of transmission detector circuit of the receiver unit of FIG. 2.

DESCRIPTION OF A PREFERRED EMBODIMENT

Figure 1:
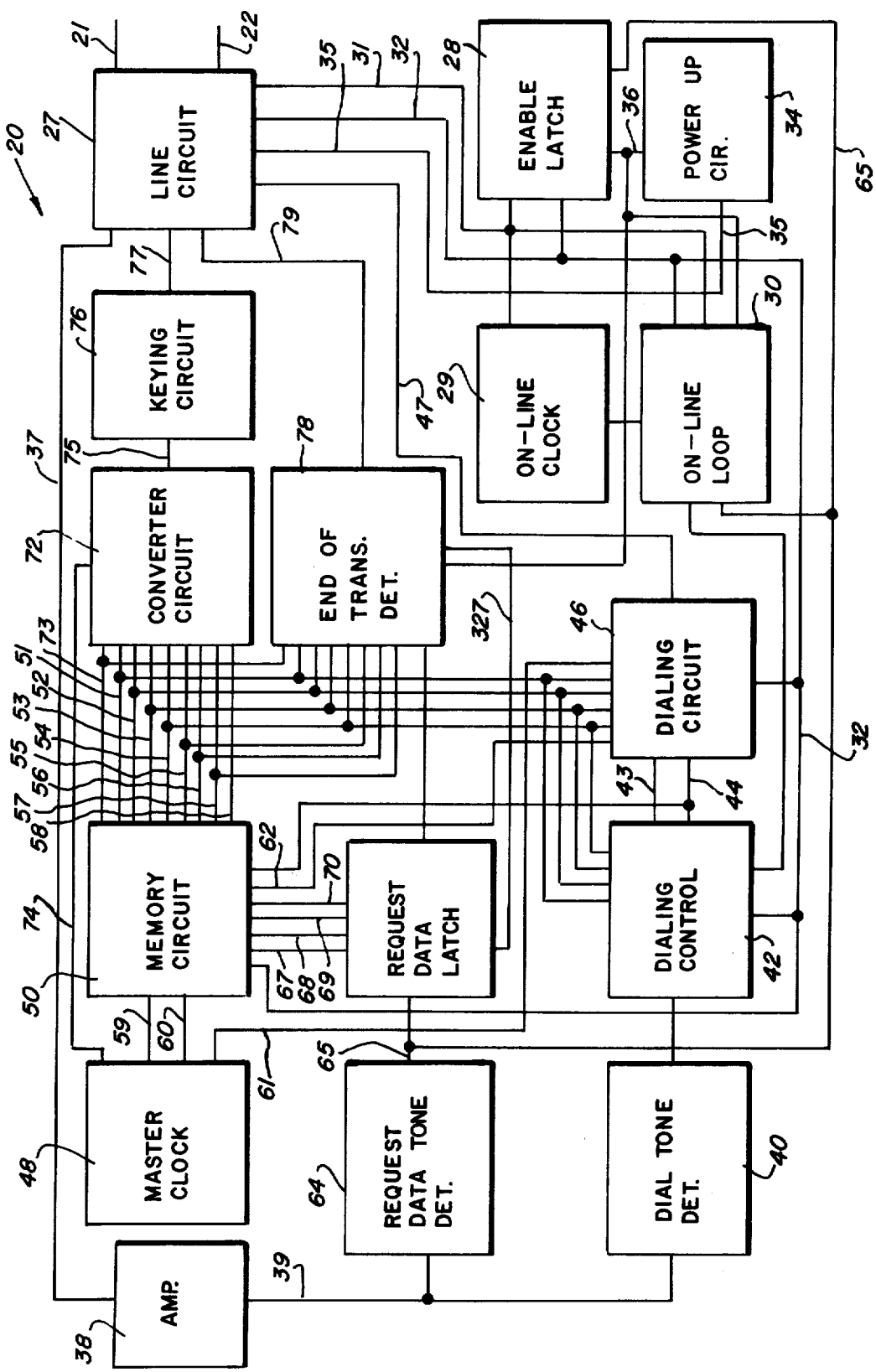
FIG. 1 is a block diagram of a transmitter unit of a telephone alarm system according to the invention.
Figure 2:
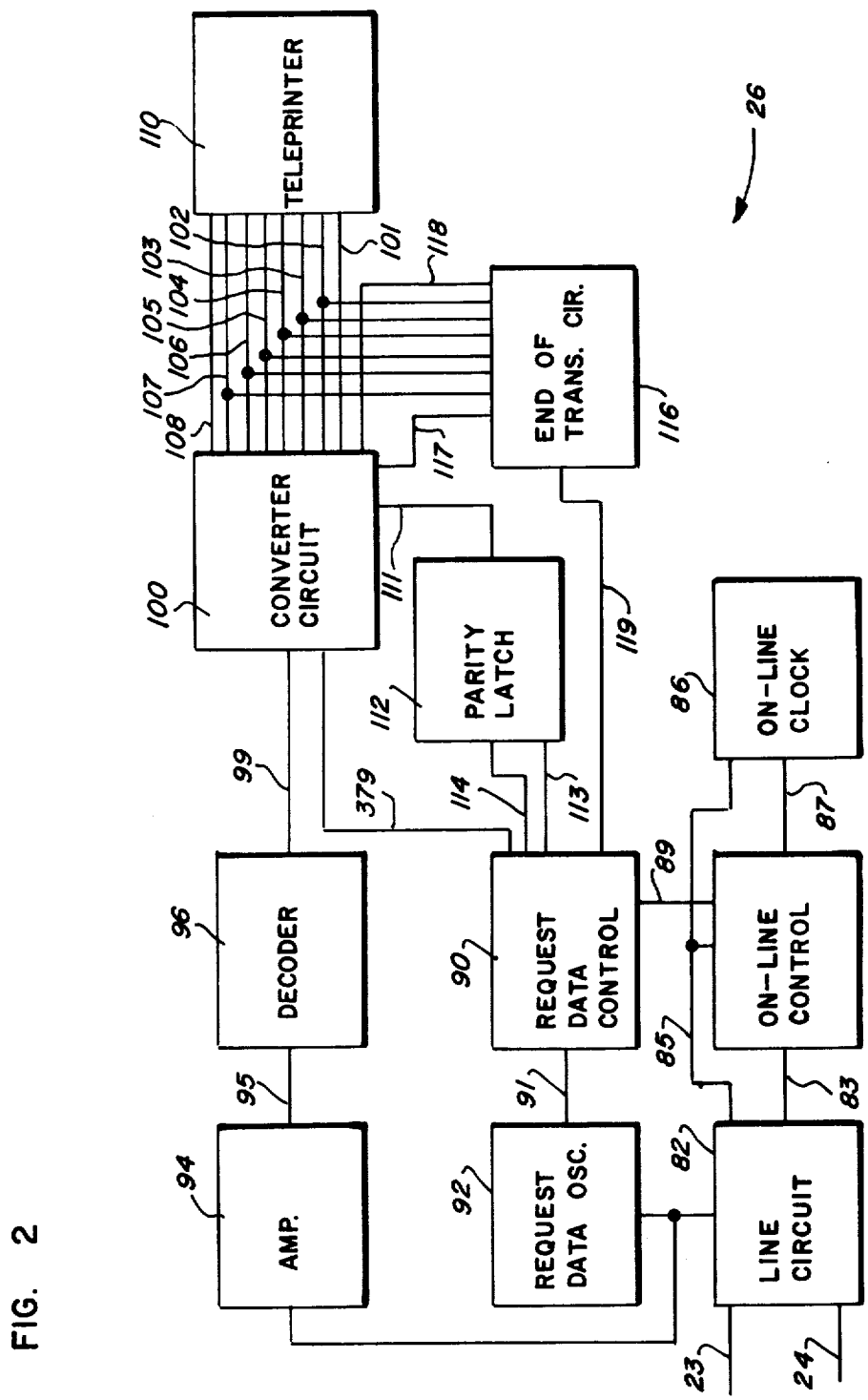
FIG. 2 is a block diagram of a receiver unit of the system.

A system constructed in accordance with the principles of the invention is illustrated in the block diagrams of FIGS. 1 and 2. The illustrated system comprises a transmitter unit 20 (FIG. 1) arranged for connection to telephone lines 21 and 22 for connection through telephone exchange circuits to another pair of telephone lines 23 and 24 connected to a receiver unit 26 (FIG. 2). The transmitter unit 20 is arranged to be activated by a push button switch, remote control, thermal switch, photocell device or the like and after establishing a connection to provide a low impedance path between lines 21 and 22, a 600 Hz dial tone is normally transmitted back from the telephone exchange circuits. The unit 20 responds by transmitting dial pulses over the lines 21 and 22 corresponding to the telephone number assigned to the telephone lines 23 and 24 connected to the receiver unit 26. An AC ring signal is then transmitted from the exchange circuits over the lines 23 and 24 to the receiving unit 26 which responds by establishing a connection to the lines 23 and 24 for transmission of a 2,225 Hz "request data" tone signal back through the completed connection to the transmitter unit 20.

In response, the transmitter unit sends data back to the receiver unit 26 including a stored code word and upon receipt and verification, the receiver unit 26 supplies signals to a suitable indicating device, preferably a teleprinter which prints out information including an identification of the particular transmitter unit from which the signals were transmitted. The receiver unit 26 may be located in a police, fire or security office and a single receiver unit may service a substantial number of transmitter units at various locations. The use of the stored code word is a very important feature. It is inserted in a memory at the time of installation and knowledge as to its identity can be restricted to highly trustworthy personnel. Additional important features are in the provision of circuits for automatically re-transmitting dial pulses if no dial tone signal is detected or if a busy signal is detected, and circuits for re-transmission of data in the event that errors are detected.

The transmitter unit 20 includes a line circuit 27, an enable latch circuit 28, an on-line clock circuit 29 and an on-line loop circuit 30 with interconnections including a line 31 connected to all four circuits and a line 32 connected to circuits 27, 28 and 30, line 32 being a reset control line connected to other circuits as well. In addition, a power-up circuit 34 is provided, connected through a line 35 to the line circuit 27 and connected through a line 36 to the enable latch circuit 28 and the on-line loop circuit 30.

The power-up circuit 34, after supply of power to the unit, supplies control signals to the circuits 27, 28 and 30. The enable latch circuit 28 may then be activated by a push button switch or the like to be placed in a latched condition and to supply a signal through line 31 to the on-line clock and loop circuits 29 and 30, the on-line loop circuit being then operative to supply a signal on the reset control line 32. In response to the signals then applied on lines 31 and 32, the line circuit effects connection of a relatively low impedance path between the telephone lines 21 and 22, a condition which is sensed by the telephone exchange circuits which normally transmit back a 600 Hz tone signal on the lines 21 and 22. If, however, a busy signal is transmitted back or if for any other reason a tone signal is not transmitted back, the on-line clock and loop circuits 29 and 30 operate after a predetermined time interval, 15 seconds for example, and repeatedly if necessary, to break and then re-establish the low impedance connection across the telephone lines 21 and 22 and to make a further attempt or repeated attempts to receive the tone signal.

The 600 Hz tone signal is applied through a line 37 to the input of an amplifier 38 having an output connected through a line 39 to the input of a dial tone detector circuit 40 which operates as a phase locked loop.

The output of the dial tone detector circuit 40 is applied through a line 41 to a dialing control circuit 42 which is connected through lines 43 and 44 to a dialing circuit 46. The dialing circuit 46 supplies pulses to the line circuit 27 through a line 47 to interrupt the connection to the telephone lines 21 and 22 and to in effect "dial" the telephone number assigned to the receiver unit 26.

For control of the dialing circuit 46 and to perform other functions, a master clock circuit 48 and a memory circuit 50 are provided. The memory circuit 50 has eight output lines 51–58, lines 51–54 being connected to the dialing circuit 46 and also to the dialing control circuit 42. Signals are applied from the master clock circuit to the memory circuit 50 through lines 59 and 60 and clock signals at a low frequency (9.375 Hz) are supplied from the master clock circuit 48 to the dialing circuit 46 through a line 61, and a control line 62 is provided between the dialing circuit 46 and the memory 50.

The dialing circuit 46 includes a counter which operates in response to the low frequency clock pulses supplied through line 61 to sequentially generate trains of pulses each train having a number of pulses corresponding to a four bit word supplied through lines 51–54 from the memory circuit 50, the memory circuit 50 including address circuits operative to supply seven such words one at a time, in sequence.

When in response to the transmission of such pulses, a connection is established through the telephone exchange circuits to the receiver unit 26, the receiver unit 26 transmits back a 2,225 Hz "request data" tone signal which is detected by a request data tone detector circuit 64 having an input connected to the output line 39 of the amplifier 38 and having an output connected through a line 65 to a request data latch circuit 66. Line 65 is also connected to the enable latch circuit 28 and to the on-line loop circuit 30 to operate the circuit 28 to an unlatched condition and to apply a control signal to a counter in the on-line loop circuit 30. With the enable latch circuit 28 placed in an unlatched condition, the re-dialing operation will not be performed and when as hereinafter described, a carry pulse is developed by a counter in the on-line loop circuit 30, the transmitter unit 20 will be placed in its initial condition.

The request data latch circuit 66 is connected to the memory unit 50 through lines 67–70 and the output lines 51–58 of the memory circuit 50 are connected to inputs of a parallel-to-serial converter circuit 72, which is also connected to the memory circuit 50 through a line 73 and to the master clock circuit 48 through a line 74.

When the request data tone is detected, address counters in the memory circuit 50 are reset and data are then transferred through lines 51–58 to the converter circuit 72 which develops a series of pulses containing corresponding information. Such pulses are applied through a line 75 to a frequency shift keying circuit 76 which operates to develop signals corresponding to the input pulses, using two different tones. Such signals are applied through a line 77 to the line circuit 27 and thence through the lines 21 and 22, the completed connection in the telephone circuits and the lines 23 and 24 to the transmitter unit 26.

Following the end of transmission of signals from the memory circuit 50 to the converter circuit 72, and after a certain delay, an end of transmission circuit 78 applies a signal through a line 79 to the line circuit 27 to disconnect the output line 77 of the keying circuit 76 from driver circuits in the line circuit 27. However, the established connection to the receiver unit is not immediately removed. The receiver unit includes a circuit which checks for parity errors and operates to request data again if an error is detected. The transmitter unit goes off line only when a counter in the on-line loop circuit 30 develops a carry pulse, as hereinafter described.

Referring to FIG. 2, the receiver unit 26 comprises a line circuit 82 connected to the telephone lines 23 and 24 and including circuits for developing an output signal on a line 83 when an AC ring signal is developed on the lines 23 and 24 from the exchange circuits. The output signal on line 83 is applied to an on-line control circuit 84 which then develops an output signal on a line 85 to apply an energizing signal to a relay in the line circuit 82 and to also initiate operation of a clock 86 which is connected to the on-line control circuit 84 through a line 87.

Thereafter, the on-line control circuit 84 develops a signal which is applied through a line 89 to a request data control circuit 90. Circuit 90 operates in response to apply a signal through a line 91 to a request data oscillator circuit 92 connected through a line 93 to the line circuit 82, a 2.225 Hz request data tone signal being then sent through the telephone lines to the transmitter unit.

Any signals sent back from the transmitter unit are applied through line 93 to the input of an amplifier 94 having an output connected through a line 95 to the input of a decoder circuit 96, the decoder circuit 96 being operative to develop output pulses in response to frequency shifted applied signals. Such output pulses are applied through a line 99 to a serial-to-parallel converter circuit 100 having eight output lines 101–108 for connection to a suitable output device such as a teleprinter 110 as illustrated. The converter circuit 100 checks for parity errors and applies a signal through a line 111 to a parity latch circuit 112 which is connected through lines 113 and 114 to the request data control circuit 90. In addition, an end of transmission detector circuit 116 is provided having inputs connected to lines 102–107 and additional lines 117 and 118 and having an output connected through a line 119 to the request data control circuit 90.

The parity latch circuit is placed in a latched condition, through line 113 when operation of the request data control circuit 90 is initiated and is placed back in its unlatched initial condition by a signal applied from the converter circuit through line 111. If, when the end of transmission signal is applied through the line 119 to the circuit 90, a signal has not been applied on line 114, indicating that the latch circuit 112 has been actuated back to its unlatched condition, operation of the request data control circuit is re-initiated to make another request for data and the operation is repeated.

After a predetermined time interval, 15 seconds for example, the on-line control circuit times out and the receiver unit is disconnected from the telephone lines 23 and 24.

Referring to FIG. 3, the line circuit 27 of the transmitter unit 20 comprises a transformer 121 having one winding 122 connected to the telephone lines 21 and 22 through a contact 123 of a relay 124 connected between a power supply terminal 125 and output terminals of a pair of positive AND gates 127 and 128 which have inputs connected together and to the output of a positive OR gate 130, the gate circuits 127 and 128 being operative as a driver circuit. One input of the positive OR gate circuit 130 is connected to the output of a positive NAND gate 132 which has one input connected to the reset control line 32 and a second input connected through line 31 to the enable latch circuit 28. A second input of the positive OR gate circuit 130 is connected to the output of another positive OR gate circuit 133 having one input connected through line 47 to the dialing circuit and having a second input connected through line 35 to the power-up circuit 34.

The transformer 121 also has a pair of balanced windings 135 and 136 having terminals connected together and through a resistor 137 to ground, the other end terminal of the winding 135 being connected through the line 37 to the input of the amplifier 38 and the other end terminal of the winding 136 being connected to a driver which comprises four dual input positive AND gates 138, the inputs being connected together and to the output of a positive AND gate circuit 140. One input of the positive AND gate circuit 140 is connected to the output of an inverter 141 having an input connected through the line 77 to the keying circuit 76. The other input of the positive AND gate circuit 140 is connected through the line 79 to the end of transmission circuit 78.

In operation, low or logical 0 signals are initially applied to both inputs of the positive NAND gate 132 and a logical 1 is produced at its output, causing a logical 1 to be produced at the output of gate circuit 130 and a logical 1 to be produced at the outputs of the positive AND gate circuits 127 and 128. Since the outputs of the gate circuits 127 and 128 are then high and the relay 4 is connected between such outputs and the power supply terminal 125, the relay 124 will be de-energized. In response to operation of the enable latch circuit 28 and the on-line loop circuit 30, logical 1 signals are applied to both inputs of the positive NAND gate circuit 132 which develops a logical 0 at its output applied to one input of the positive OR gate circuit 130, the other input of which has a logical 0 applied thereto. The positive OR gate circuit 130 then develops a logical 0 at its output which is applied through the positive AND gate circuits 127 and 128, operative as a driver, to energize the relay 124 and to close the contact 123. This condition provides a relatively low impedance between lines 21 and 22 which is sensed at the central exchange and a dial tone signal should normally be sent back over the telephone lines.

The dial tone signal is applied from the winding 135 to the dial tone detector circuit 40 which functions through the control circuit 42 to initiate operation of the dialing circuit 46 which applies a series of pulse signals through line 47 to the positive OR gate circuit 133 which develops a logical 1 signal at its output, applied through the positive OR gate circuit 130 and the positive AND gate circuits 127 and 128 to de-energize the relay 124 and to transmit impulses over the telephone lines which are sensed by the telephone exchange circuits.

If the circuit is completed to the receiver unit 20, it will send back a 2,225 Hz request data tone signal which will be applied from the winding 135 to the 2,225 Hz tone detector and in response, keyed signals are applied from the keying circuit 76 and through line 77 to the input of the inverter 141, the output of the inverter 141 being connected to an input of the gate circuit 140. The keyed signals are thus applied through the driver, which consists of gate circuits 138, to the winding 136 and are then transmitted over the telephone lines 21 and 22 to the receiver unit 26.

It is noted that the second input of the positive AND gate circuit 140 is connected through the line 79 to the end of transmission circuit 78, a logical 1 signal being applied when the end of transmission circuit 78 is placed in a latched condition from a signal applied from the request data latch circuit 66 and a logical 0 signal being applied when the circuit 78 is placed in an unlatched condition following the end of transmission of signals from the memory circuit 50.

Referring to FIG. 4, the enable latch circuit 28 of the transmitter unit 20 includes a push button switch having a normally open contact 143 and a normally closed contact 144, the normally open contact 143 being connected in series with a resistor 145 between a power supply terminal 146 and a circuit point 147 with a resistor 148 being connected between power supply terminal 146 and circuit point 147. The normally closed contact 144 is connected in series with a resistor 150 between ground and the circuit point 147, a capacitor 151 being connected between circuit point 147 and ground. The capacitor 151 is normally discharged through the resistor 150 and normally closed contact 144. When the push button switch is operated to close the normally open contact 143 and to open the normally closed contact 144, the capacitor 151 is charged through the resistor 145 and the potential of the circuit point 5 rises exponentially.

The circuit point 147 is connected to one input of a positive AND gate circuit 152 having an output connected to one input of a positive NOR gate 153 which has an output connected to one input of a second NOR gate 154. The output of the gate 154 is connected to the second input of the gate 153 and is also connected to one input of an OR gate 156 having a second input connected to the reset line 32. The output of the OR gate 156 is connected through an inverter 157 to the second input of the positive AND gate 152. A second input of the positive NOR gate 154 is connected to the output of a gate circuit 158 which has one input connected through line 36 to the power-up circuit 34 and a second input connected through line 65 to the output of the request data tone detector 64.

In operation, when the push button switch is operated, the positive signal developed at the circuit point 147 is applied through the gate circuit 152 to the positive NOR gate circuit 153.

The NOR gate circuit 153 then shifts from a logical 1 (high) output to a logical 0 (low) output which is supplied to one input of the NOR gate circuit 154, the other input of which has a logical 0 input. The output of the gate circuit 154 then shifts from a logical 0 to a logical 1 which is supplied to the second input of gate circuit 10 to maintain a logical 0 at its output and to effect a latched condition of the circuit.

The circuit is released from its latched condition by application of a high or logical 1 signal at the output of gate 158, developed in response to a signal applied through line 65 from the request data tone detector 64. The logical 1 at the output of gate circuit 154 is also applied to one input of the positive OR gate circuit 156 to shift its output from a logical 0 to a logical 1, the output of gate circuit 156 being applied back through the inverter 157 to the second input of the AND gate circuit 152 to shift it from a logical 1 to a logical 0 and to prevent the AND gate circuit 152 from being effective in response to further operations of the push button switch, until release of the circuit from its latched condition.

The output of the positive OR gate circuit 156 is also applied through the line 31 to the on-line clock circuit 29 and to the on-line loop circuit 30 which in turn supplies back a logical 1 on the reset line 32 to maintain a logical 1 at the output of the positive OR gate circuit 156. In addition, the logical 1 at the output of the positive OR gate circuit 156 is applied through line 31 to the line circuit 27 to effect connection of circuitry to the telephone lines as described above.

Referring to FIG. 5, the on-line clock circuit 29 of the transmitter unit 20 comprises an integrated circuit 160 having terminals connected to ground and to a power supply terminal 162 and terminals connected through capacitors 163 and 164 and to ground, one being connected through a resistor 165 to another terminal which is connected through a resistor 166 to the power supply terminal 162. An input terminal is connected through a line 31 to the enable latch circuit and an output terminal is connected through a capacitor 167 to ground and through a line 168 to the on-line loop circuit 30.

Initially, a low or logical 0 signal is applied through line 31 to the input terminal of the circuit 160 and when the signal is shifted to a high or logical 1 state, the circuit then operates as an oscillator to apply pulses at a predetermined frequency, dependent upon the values of the components, through line 168 to the on-line loop circuit 30.

Referring to FIG. 6, the on-line loop circuit 30 of the transmitter unit 20 comprises a counter circuit 170 having a clock signal input terminal connected through the line 168 to the output of the on-line clock circuit 29. A positive AND gate circuit 172 is provided having one input connected through line 31 to the enable latch circuit 28, a second input connected through line 36 to the power-up circuit 34 and an output connected to a load terminal of the counter circuit 170.

Another positive AND gate circuit 174 is provided having an input connected through a line 175 to the dialing control circuit, a second input connected through the line 65 to the output of the 2,225 Hz detector circuit 64 and an output connected to a clear input terminal of the counter circuit 170. An output terminal of the counter circuit 170 is connected through an inverter 176 to the reset control line 32.

In operation, a signal applied through line 31 from the enable latch circuit 28 to the gate circuit 172 causes its output to shift from a logical 0 to a logical 1 whereupon the counter circuit 170 starts counting clock pulses supplied through line 168 from the on-line clock circuit 29. Also, the carry output terminal of the counter circuit 170 shifts from a logical 1 output to a logical 0 output to develop, through the inverter 176, a logical 1 output on the reset line 32.

Operations are then initiated as above described. The counter circuit 170 may be cleared by a logical 0 signal on line 175 from the dialing control circuit 42 or a logical 0 signal on line 65 from the request data tone detector circuit 64, to start counting again. When a carry output terminal goes to a logical 0 condition, various circuits are reset through the reset control line 32 and operation is stopped, provided that the enable latch circuit 28 has been placed in an unlatched condition by a signal on line 65. If not, the counter circuit 170 continues to operate while another sequence of operations takes place, until the carry output terminal again goes to a logical 0 condition.

Referring to FIG. 7, the power-up circuit 34 of the transmitter unit 20 comprises a monostable multivibrator circuit 178 having a "Q" output connected through the line 35 to the line circuit 27 and having a "Q" connected through the line 36 to the enable latch circuit 28, the on-line loop circuit 30 and the end of transmission circuit 78. A pair of terminals are connected together through a capacitor 179 and a diode 180, the junction therebetween being connected through a resistor 181 to a power supply terminal 182. A trigger input terminal is connected to the output of a positive NAND gate circuit 183 having its inputs connected together to the output of a second NAND gate circuit 184 the inputs of which are connected together and through a capacitor 185 to ground and through a resistor 186 to the power supply terminal 182. During operation of the transmitter unit 20, a logical 0 signal is developed on the line 35 while a logical 1 signal is developed on the line 36.

Figures 8, 9, 10:
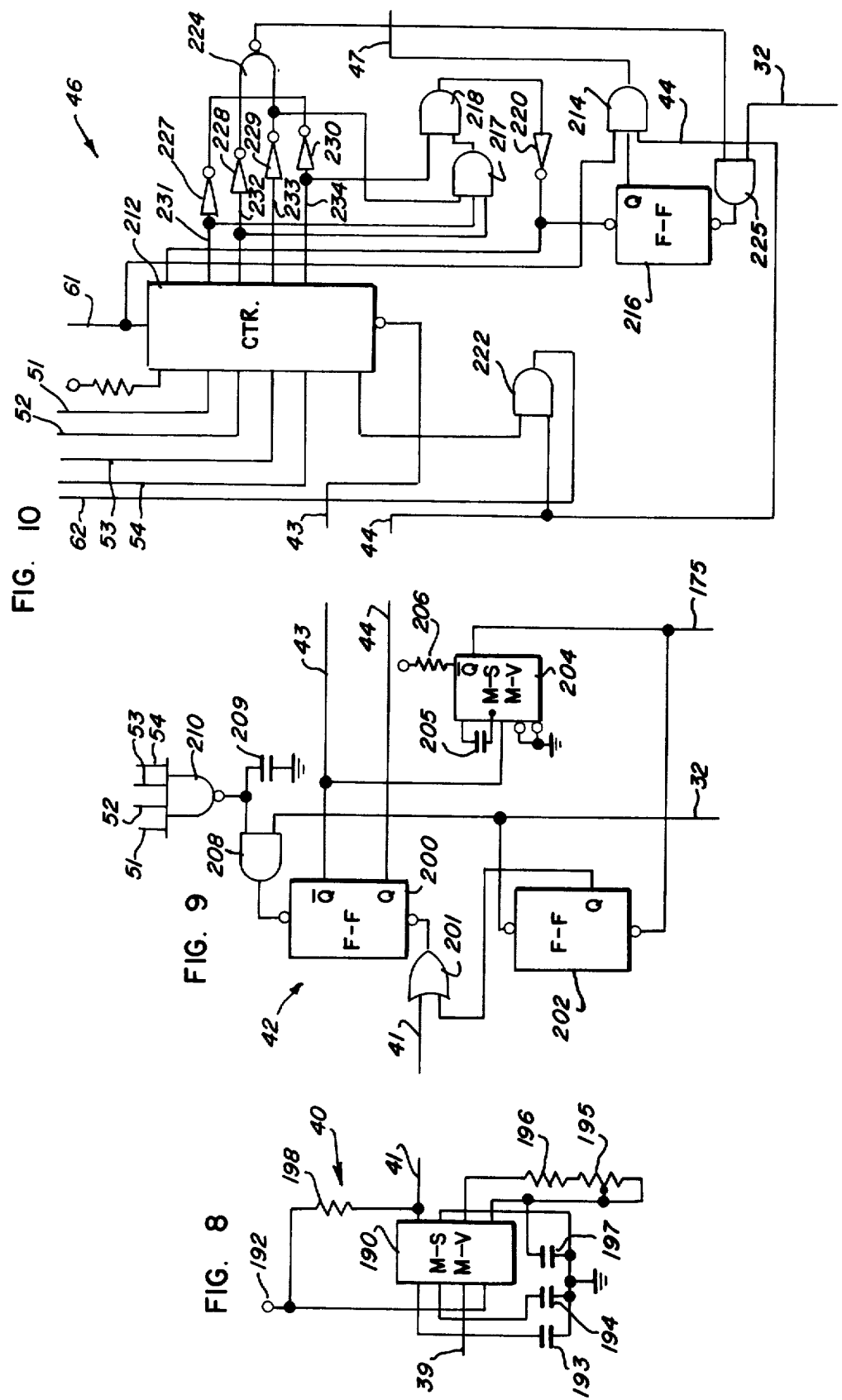
FIG. 8 is a circuit diagram of a dial tone detector circuit of the transmitter unit of FIG. 1.
FIG. 9 is a circuit diagram of a dialing control circuit of the transmitter unit of FIG. 1.
FIG. 10 is a circuit diagram of a dialing circuit of the transmitter unit of FIG. 1.

Referring to FIG. 8, the 600 Hz tone detector circuit 40 comprises an integrated circuit 190 having an input terminal connected through the line 39 to the output of the amplifier 38 and having additional terminals connected to ground, to a power supply terminal 192 and through capacitors 193 and 194 to ground. An adjustable resistor 195 and a fixed resistor 196 are connected in series between an additional pair of terminals one of which is connected through a capacitor 197 to ground. An output terminal of the integrated circuit 190 is connected through a resistor 198 to the power supply terminal 192 and is also connected through the line 41 to the dialing control circuit.

The circuit 40 operates as a phase-locked loop and when a 600 Hz signal is applied thereto, the output on line 41 goes from a high value to a low or logical 0 value to initiate operation of the dialing control circuit 42.

Referring to FIG. 9, the dialing control circuit 42 includes a flip-flop 200 having a preset input connected to the output of a positive OR gate circuit 201 having one input connected through line 41 to the output of the dial tone detector circuit 40 and having a second input connected to the "Q" output of another flip-flop 202 which has a set input connected to the reset control line 32 and a preset input connected to the line 175 which is connected to the "$\overline{Q}$" output of a monostable multivibrator 204 which has terminals connected together through a capacitor 205 and a terminal connected through a resistor 206 to a power supply terminal 207. The flip-flop 200 has "$\overline{Q}$" and "Q" outputs connected through the lines 43 and 44 to the dialing circuit 46, the "$\overline{Q}$" output being also connected to an input terminal of the monostable multivibrator 204. A clear input of the flip-flop 200 is connected to the output of a positive AND gate circuit 208 having one input connected to the reset line 32 and a second input connected through a capacitor 209 to ground and to the output of a positive NAND gate circuit 210 which has four inputs connected to the output lines 51-54 of the memory circuit 50.

In the operation of the dialing control circuit 42 of FIG. 9, when a logical 0 signal is applied through line 41 to the positive OR gate circuit 201, the output thereof goes from a logical 1 to a logical 0, the other input of the gate circuit 201 having a logical 0 applied thereto. The flip-flop 200 is then triggered to cause the "$\overline{Q}$" output to go from a logical 1 to a logical 0 and the "Q" output to go from a logical 0 to a logical 1. Operation of the dialing circuit is then initiated. At the end of the dialing operation, a signal is developed at the output of the gate circuit 210 which is applied through the gate circuit 208 to the flip-flop 200. The monostable multivibrator 204 is then triggered and after a certain delay, the flip-flop 202 is triggered to inhibit application of a triggering signal from line 41 through the gate circuit 201 to the flip-flop 200 until the circuit is reset by application of a logical 0 signal through the reset control line 32.

The dialing control circuit thus performs a latching function, being operated to a latched condition in response to the dial tone signal and operated to an unlatched condition in response to concurrent signals from output lines 51-54 of the memory circuit 50.

Referring to FIG. 10, the dialing circuit 46 includes a counter circuit 212 having an enable input connected through line 43 to the dialing control circuit 42 to be rendered operative when the dialing control circuit is placed in a latched condition. The counter circuit has inputs connected to the output lines of the memory circuit 50 and a 9.375 Hz clock signal is applied through line 61 to the counter circuit 212 and also to an input of a positive AND gate circuit 214. A second input of the gate circuit 214 is connected to line 44 and a third input of the gate circuit 214 is connected to a "Q" output of a flip-flop 216. With logical 1 signals applied to the gate circuit 214 from the dialing control circuit 42 through line 44, and from the flip-flop 216 positive clock pulses developed on the line 61 will be applied through the gate circuit 214 to the output line 47 of the dialing circuit 46.

After a number of pulses corresponding to the data supplied through lines 51-54 from the memory circuit 50 and corresponding to the first digit of a telephone number to be called, a decoding circuit including positive AND gates 217 and 218 and an inverter 220 applies a signal to a preset input of the flip-flop 216 to switch the flip-flop 12 to prevent further transmission of the 9.375 Hz dial pulses through the positive AND gate 214 to the output line 47.

At the same time, a signal is applied from the output of inverter 220 to a load terminal of the counter circuit 212. A signal is then applied from the counter circuit 212 to one input of a positive AND gate circuit 222, the other input thereof being connected to line 44. The output of gate circuit 222 is connected through line 62 to the memory circuit 50 which then presents another word on the lines 51-54 corresponding to the next digit to be dialed. Also, the flip-flop 216 is placed in its initial condition from circuitry including a four input positive NAND gate circuit 224 having an output connected through a positive AND gate circuit 225 to the clear input of flip-flop 216 and having inputs connected through inverters 227-230 to output lines 231-234 of the counter circuit 212.

This operation is continued to develop trains of pulses on the output line 47 corresponding to the digits of the number to be dialed and when all digits have been transmitted, the dialing control circuit 42 is placed in its initial unlatched condition as previously described.

Referring to FIG. 11, the master clock circuit 48 of the transmitter unit 20 comprises an oscillator 236 which supplies a 2400 Hz signal through the line 74 to the converter circuit 72 and also to an input of a four-bit binary counter circuit 238 having an output which supplies a 150 Hz signal through a line 239 to the input of a second four-bit binary counter 240, which has four output terminals connected to input terminals of a decoder circuit 242, one output terminal of the counter circuit 240 being connected through line 61 to the dialing circuit 46 to supply a 9.375 Hz signal thereto. Output terminals of the decoder circuit 242 are connected through lines 59 and 60 to the memory circuit 50.

Referring to FIG. 12, the memory circuit of the transmitter unit 20 includes an integrated circuit memory 244 having terminals connected to the output lines 51-58 and having additional terminals connected through lines 245-248 to a counter circuit 250 and through lines 251-254 to a counter circuit 256. Counter circuits 250 and 256 are operative as address circuits, the counter circuit 250 being operative to control the memory circuit 244 to sequentially develop on the output lines 245-248 four-bit words corresponding to the digits of a number to be dialed and the counter circuit 256 being operative to control the memory 1 to develop on the output lines 55-58 a four-bit code word or words. Clock inputs of the counter circuits 250 and 256 are connected through a capacitor 257 to ground and to the output of a positive OR gate circuit 258 having one input connected through line 62 to the dialing circuit 46 and having a second input connected to the output of a positive AND gate 260 which has one input connected through line 67 to the request data latch circuit 66 and also to one input of a positive AND gate circuit 261, the other input of gate circuit 261 being connected through line 59 to the clock circuit 48. A second input of gate circuit 260 is connected through line 60 to the clock circuit 48. Load output terminals of the counter circuits 250 and 256 are connected together and through line 68 to the request data latch circuit 66. Line 68 is also connected to one input of a positive AND gate circuit 262, the other input of circuit 262 being connected to the output of gate circuit 261. The output of gate circuit 262 is connected through line 73 to the converter circuit 72 to apply strobe signals thereto and to cause transmission of keyed signals as hereinafter described.

The memory circuit 50 further includes a circuit for supplying a reset signal to the request data latch circuit 66 when an end of data code signal is produced on the output lines 51–58. A positive NAND circuit 263 is provided having inputs connected directly to output lines 52, 53 and 57, inputs connected through inverters 265–268 to output lines 51, 54, 55 and 57 and an input connected through line 69 to the request data latch circuit 66. The output of the NAND gate circuit 263 is connected through an inverter 270 to one input of a positive OR gate circuit 271 the other input of which is connected to output line 44 of the dialing control circuit 42. The output of the gate circuit 271 is connected to inputs of a positive AND gate 272 and also through an inverter 273 and a resistor 274 to a circuit point 275 which is connected to an additional input of the gate circuit 272 and also through a capacitor 276 to ground. The output of the gate circuit 272 is connected through an inverter 278 to "clear" terminals of the counter circuits 250 and 256 and also to one input of a positive AND gate circuit 270 having an output connected to line 70 to supply a reset signal to the request data latch circuit 66, the other input terminal of gate circuit 279 being connected to the reset control line 32.

When the end data code is produced the address counter circuits 250 and 256 are cleared and also the request data latch circuit is reset to an initial unlatched condition.

The request data tone detector 64 has a circuit substantially the same as that of the dial tone detector circuit 40 of FIG. 8, differing only with respect to the values of resistors and capacitors to respond to a 2,225 Hz tone instead of a 600 Hz tone.

Referring to FIG. 13, the request data latch circuit 66 comprises a flip-flop 281 having a set input terminal connected to the output of a positive AND gate circuit 282 which has inputs connected together and through line 65 to the output of the request data tone detector circuit 64. The flip-flop 281 has a reset input connected through the line 70 to the memory circuit 50. A monostable multivibrator 284 is provided which is connected through line 68 to load terminals of the counters 250 and 256 of the memory circuit 50 and also to the gate circuit 262 thereof, which controls application of strobe signals to the converter circuit 72. The monostable multivibrator 284 has terminals connected through resistors 285 and 286 to power supply terminals and terminals connected to a capacitor 287. An input of the monostable multivibrator 284 is connected to the "Q" output of the flip-flop 281.

In operation, the flip-flop 281 is set in response to an output signal from the request data tone detector 64, applied through the line 65, and is reset in response to an end data code signal developed in the memory circuit 50 in the manner as above described. The flip-flop 281 together with the monostable multivibrator circuit 284 control the gate circuits in the memory circuit 50 to control the address counters and the transmission of data to the converter circuit 72 and to also control strobing of the converter circuit 72.

Referring to FIG. 14, the parallel-to-serial converter circuit 72 includes an integrated circuit 290 having terminals connected to the output lines 51-58 of the memory circuit 50, a strobe input connected through line 73 to receive strobe signals from the memory circuit 50 and a clock input terminal connected through the line 74 to the master clock circuit 48 to receive 2400 Hz clock pulses therefrom. The circuit 290 has an output terminal connected through two inverter circuits 291 and 292 in series and through line 75 to the keying circuit 76, the inverter circuits 291 and 292 performing an isolation function. In response to a strobe signal applied through line 73, the circuit 290 generates a train of pulses with the number of pulses in each train being controlled by the data supplied through lines 51-58 from the memory circuit 50.

Referring to FIG. 15, the keying circuit 76 includes an integrated circuit 294 operative to develop a frequency shift keying signal by the use of two different tones. The circuit 294 has a terminal connected directly to a power supply terminal 295 and another terminal connected to a voltage divider circuit including a potentiometer 296 connected between the power supply terminal 294 and ground. An input terminal of the circuit 294 is connected through a resistor 297 to the emitter of an isolation device 298, the emitter being connected through a resistor 299 to the power supply terminal 295. A light-emitting diode 300 of the device 298 is connected in series with a resistor 301 between the input line 75 and a power supply terminal. An output terminal of the circuit 294 is connected through a resistor 303 and a diode 304 to ground, the diode 304 being part of another isolation device 305 having an emitter connected to ground and a collector connected through a resistor 306 to a power supply terminal and also connected through the line 77 to the line circuit 27.

Referring to FIG. 16, the end of transmission circuit 78 of the transmitter unit 20 comprises a positive NAND gate circuit 310 having inputs connected through inverters 311–16 to lines 51 – 55 and 57, another input connected directly to line 56 and an eighth input connected through an inverter 317 to the data strobe control line 73. The output of the positive NAND gate circuit 310 is connected to inputs of a monostable multivibrator 318 having terminals connected together through a capacitor 320 and additional terminals connected through resistors 321 and 322 to a power supply terminal. The multivibrator 318 has a "Q" output connected to inputs of a positive AND gate circuit 323 and a positive NAND gate circuit 324. A second input of gate circuit 323 is connected through the line 36 to the power-up circuit 34. A second input of the NAND gate circuit 324 is connected to the output of a NAND gate circuit 325 which is connected to the input of another NAND gate circuit 326, the output of the NAND gate circuit 326 being connected to one input of the gate circuit 325. The second input of the gate circuit 325 is connected to the output of the gate circuit 323 while the second input of the gate circuit 326 is connected through a line 327 to the request data latch circuit 66. In operation, the gate circuits 325 and 326 operate as a latch circuit, being placed in a latched condition when the request data tone detector 64 develops an output signal which causes the line 327 to go from a logical 1 to a logical 0 condition. The gate circuit 324 then develops a logical 1 output which is applied through line 79 to the line circuit and which permits transmission of keyed signals to the telephone lines. The positive NAND gate circuit 310 responds to an end of transmission code produced on the output lines of the memory circuit 50 and triggers the monostable multivibrator 318 to apply a signal through the gate circuit 323 to the gate circuit 325 and to place the circuit in an unlatched condition. As a result, transmission of further keyed signals to the telephone line is precluded until the circuit is again placed in a latched condition in response to an output signal from the request data tone detector.

Figure 17:
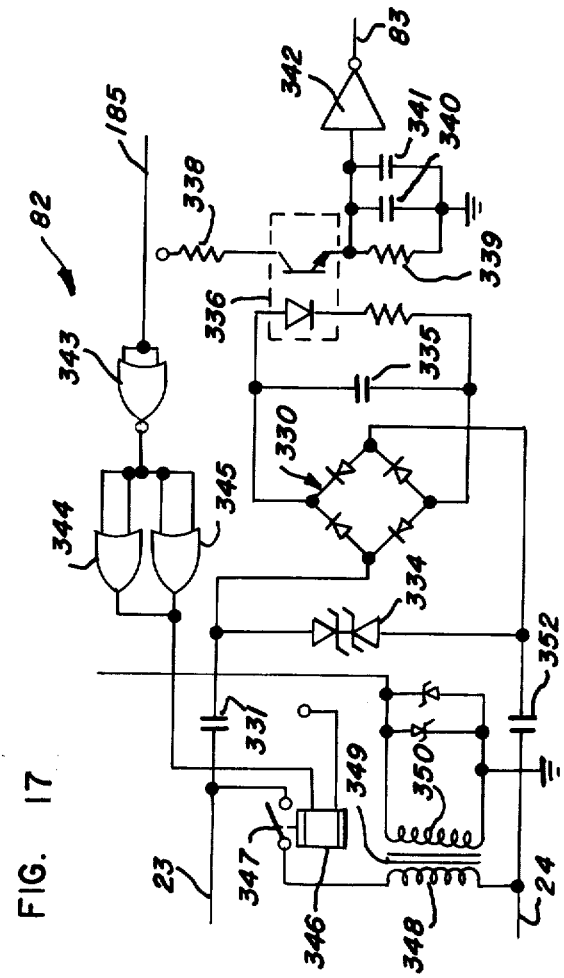
FIG. 17 is a circuit diagram of a line circuit of the receiver unit of FIG. 2.

Referring now to FIG. 17, the line circuit 82 of the receiver unit 26 includes a bridge rectifier 330 having input terminals connected through capacitors 331 and 332 to the telephone lines 23 and 24, a voltge protection device 334 being connected across the input of the rectifier 330. The output of the rectifier 330 is connected to a capacitor 335 and to the input of a isolation device 336 and a resistor 337 in series. The collector of the isolation device 336 is connected through a resistor 338 to a power supply terminal while the emitter thereof is connected to ground through a resistor 339 and a pair of capacitors 340 and 341 in parallel and also directly through an inverter 342 to the output line 83.

When an AC ring signal is developed across the telephone lines 23 and 24 from the telephone exchange circuits, which may have a 90 volt RMS value, for example, a positive voltage is applied to the inverter 342 which, in turn, develops a logical 0 signal at its output connected to line 83. In response, the on-line control circuit 84 develops a signal on line 85 which is connected to both inputs of a positive NOR gate circuit 343, the output of the gate circuit 343 being connected to inputs of a pair of positive OR gate circuits 344 and 345. The outputs of the gate circuits 344 and 345 are connected together and through a relay 346 to a power supply terminal. The relay 346 has a contact 347 connected in series with a winding 348 of a transformer 349 between the telephone lines 23 and 24. A second winding 350 of the transformer 349 is connected between ground and the line 93.

When following application of a logical 0 signal from line 83 to the on-line control circuit 84, a signal is received back through line 85, the relay 346 is energized to connect winding 348 between the telephone lines 23 and 24 and to permit transmission of a request data tone signal to the transmitter unit and also to permit thereafter receipt of data signals from the transmitter unit 20.

Figure 18:
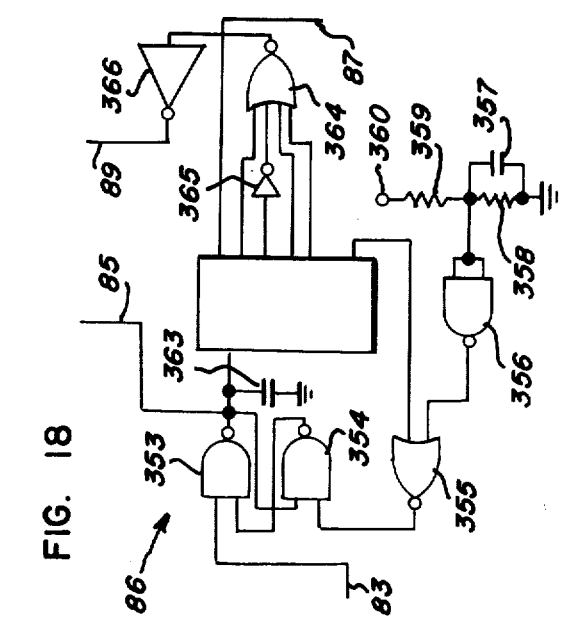
FIG. 18 is a circuit diagram of an on-line control circuit of the receiver unit of FIG. 2.

Referring to FIG. 18, the on-line control circuit 84 of the receiver unit 26 includes a pair of positive NAND gate circuits 353 and 354 operable as a latch circuit with one input of each gate circuit being connected to the output of the other. A second input of the gate circuit 353 is connected through the line 83 to the line circuit 82 and a second input of the gate circuit 354 is connected to the output of a positive NOR gate circuit 355 having one input connected to the output of a posiitive NAND gate circuit 356 both inputs of which are connected together and through a capacitor 357 and a resistor 358 to ground and also through a resistor 359 to a voltage supply terminal 360.

A second input terminal of the gate circuit 355 is connected to the carry output terminal of a counter circuit 362 which has a clear input terminal connected to the output of the gate circuit 353 and also to the line 85 and through a capacitor 363 to ground. A clock input terminal of the counter 362 is connected through line 87 to the on-line clock circuit 86 which has a circuit arrangement similar to that of the on-line clock circuit 29 of the transmitter unit 20, shown in FIG. 5.

Output terminals of the counter circuit 362 are connected to inputs of a positive NOR gate circuit 364, with an inverter 365 in one connection, the output of the gate circuit 364 being connected through an inverter 366 to the line 89 which is connected to the request data control circuit 90.

In operation, the latch circuit including gate circuits 353 and 354 is placed in a latched condition in response to a logical 0 signal applied from the line circuit 82 through the line 83, to then apply a signal through line 85 to energize the line relay 346 in the line circuit, to apply a clear signal to the counter 362 and to initiate operation of the on-line clock circuit 84. After application of a predetermined number of clock pulses, the positive NOR gate circuit 64 develops a logical 1 output which is applied through the inverter 366 to develop a logical 0 output on the line 89. Reset of the latch circuit is controlled from the timing circuit including capacitor 357 and resistors 358 and 359 and from the carry output of the counter circuit 362.

Figure 19:
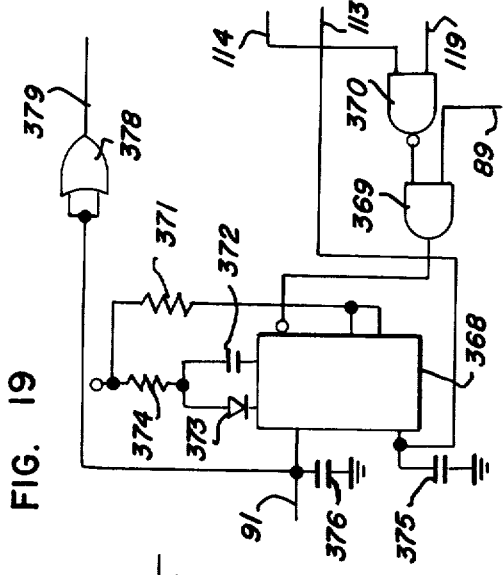
FIG. 19 is a circuit diagram of a request data control circuit of the receiver unit of FIG. 2.

Referring to FIG. 19, the request data control circuit 90 includes a monostable multivibrator 368 having an input terminal connected to the output of a positive AND gate circuit 369 which has one input connected to the line 89 and a second input connected to the output of a positive NAND gate circuit 370, one input of the gate circuit 370 being connected through line 114 to the parity latch circuit 112 and the other input of the gate circuit 370 being connected through line 119 to the output of the end of transmission circuit 116. The monostable multivibrator 368 has terminals connected through a resistor 371 to a power supply terminal and additional terminals connected through a capacitor 372 and a diode 373 to a circuit point connected through a resistor 374 to the power supply terminal, the duration of operation of the multivibrator 368 in response to a triggering signal being controlled by the values of such components.

The "$\overline{Q}$" output terminal of the multivibrator 368 is connected through a capacitor 375 to ground and also through the line 113 to the parity latch circuit 112. The "Q" output terminal of the multivibrator 368 is connected through a capacitor 376 to ground and also through the line 91 to the request data oscillator 92. The "Q" output is also connected to both inputs of a positive OR gate circuit 378 the output of which is connected through a line 379 to the converter circuit 100.

In operation, the multivibrator 368 is triggered in response to a logical 0 signal applied through line 89 from the on-line control circuit 84 and for a predetermined time interval, a signal is applied through line 91 to the request data oscillator circuit 92 to cause operation thereof. At the same time, a signal is applied through line 379 to inhibit operation of the converter circuit 100. When the multivibrator 368 is returned to its initial state, a signal is applied through line 113 to place the parity latch circuit 112 in a latched condition. If, when an end of transmission signal is received through line 119, the parity latch circuit 112 has not been placed in its unlatched condition, a triggering signal is applied through gate circuits 370 and 369 to re-initiate operation of the monostable multivibrator 368 to cause the request data oscillator circuit 92 to again operate.

The circuit of the request data oscillator 92 is not shown, it being understood that a standard type of oscillator circuit is used, operative to generate a signal at a predetermined frequency, such as 2,225 Hz for example.

After transmission of the request data signal, received signals are amplified by the amplifier 94, which may have a standard type of construction, and are applied through the line 95 to the decoder circuit 96.

Figure 20:
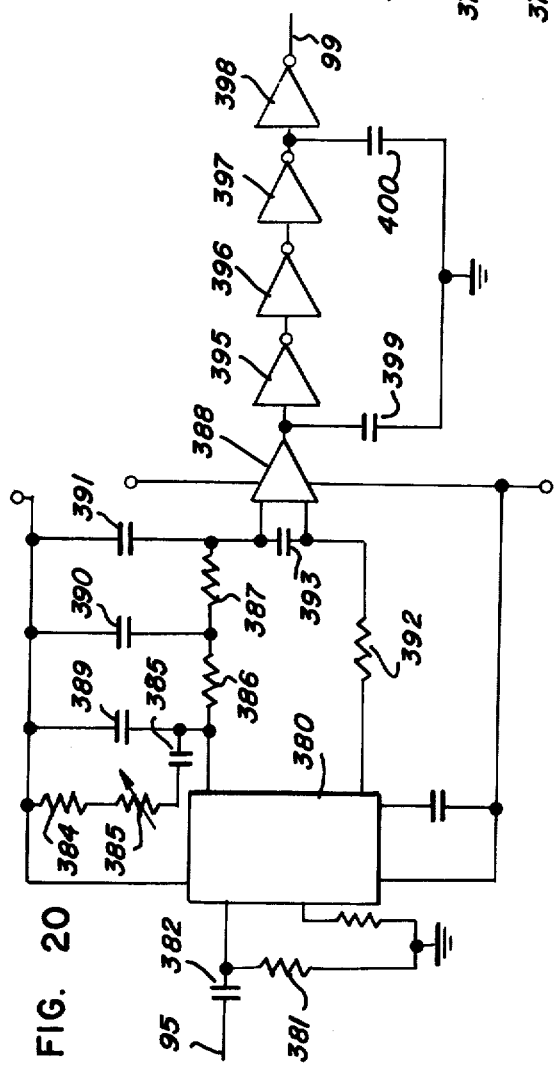
FIG. 20 is a circuit diagram of a decoder circuit of the receiver unit of FIG. 2.

Referring to FIG. 20, the decoder circuit 96 includes an integrated circuit 380 having an input terminal connected through a resistor 381 to ground and also through a capacitor 382 and through line 95 to the output of the amplifier 94. Another terminal of the circuit 380 is connected through an adjustable resistor 383 and a fixed resistor 384 to a power supply terminal and also through a capacitor 385 to an output terminal which is connected through resistors 386 and 387 to an input terminal of an amplifier 388, capacitors 389, 390 and 391 being connected between the power supply terminal and the output terminal of circuit 380, the junction between resistors 386 and 387 and the input terminal of amplifier 388, respectively. A second output terminal of the amplifier 380 is connected through a resistor 392 to a second input of the amplifier 388 with a capacitor 393 being connected between the two input terminals of the amplifier 388.

The circuit 380 together with the amplifier 388 operate to decode frequency shift signals applied thereto, trains of pulses being developed at the output of the amplifier 388 with the number of pulses in each train corresponding to the data transmitted.

The output of the amplifier 388 is applied to a Schmitt trigger circuit which includes four inverter circuits 395-398 in series with a capacitor 399 across the input and a capacitor 400 between the input of the final inverter 398 and ground. The output of the final inverter 398 is connected through line 99 to the converter circuit 100.

Referring to FIG. 21, the converter circuit 100 includes an integrated circuit 402 having an input terminal connected through line 99 to the output of the decoder circuit 96 and having a clock signal input terminal connected to the output of a clock circuit 403 which supplies clock pulses at a predetermined frequency, 2400 Hz for example. Output terminals of the circuit 402 are connected to inputs of seven positive AND gate circuits 405-411, operative as drivers, the outputs of the gate circuits 405-411 being connected to the output lines 101-107. A strobe signal output terminal of the circuit 402 is connected to the output line 108.

The circuit 402 operates in response to serial trains of pulses applied thereto and in response to clock signals applied from the oscillator 403 to develop signals in a parallel format on the output lines 101-107 which are clocked to a teleprinter or other indicator device under control of strobe signals applied through the output line 108. The circuit 402 is arranged to detect parity errors and to develop an output signal on a line 111 when no parity error is detected.

Referring to FIG. 22, the parity latch circuit 112 includes a pair of positive NAND gate circuits 413 and 414 with one input of each circuit connected to the output of the other. A second input of the circuit 413 is connected through an inverter 415 and through line 111 to the converter circuit 100 and the second input of the circuit 414 and the output of the circuit 413 are connected through lines 113 and 114 to the request data control circuit 90.

In operation, the circuit is placed in a latched condition by a signal applied through line 113 and is restored to its initial unlatched condition by a signal applied through line 111 from the converter circuit 100.

Referring to FIG. 23, the end of the transmission detector circuit 116 includes a positive NAND gate circuit 416 having one input connected through line 117 to the converter circuit 100, another input terminal connected through an inverter 418 to the line 118, additional input terminals connected through inverters 419-423 to output lines 102 and 104-107 of the converter 100 and another input terminal connected directly to output line 103 of the converter circuit 100. The output of the gate circuit 416 is connected to input terminals of a monostable multivibrator 424 which has a "$\overline{Q}$" output terminal connected to one input of a positive AND gate circuit 425 and also through an inverter 426 and a resistor 427 to the second input of the gate circuit 425, the second input being connected through a capacitor 428 to ground. In operation, when output signals are produced by the inverter circuit 100 corresponding to an end of transmission code, the output of the gate circuit 416 is shifted from a logical 1 to a logical 0 to trigger the multivibrator 424 and after a certain time delay, allowing for the parity check, an output signal is developed on line 119. If at that time, the parity latch circuit 112 has not been placed in its initial unlatched condition in response to a parity signal, the signal applied through line 119 will re-initiate operation of the request data control circuit 90.

It will be understood that modifications and variations may be effected. For example, the dialing portion of the system may be modified to accommodate tone dialing, still using the memory arrangement as shown and described.

It will be further understood that other modifications and variations may be effected without departing from the spirit and scope of the novel concepts of this invention.

We claim as our invention:

1. In a telephone alarm system, transmitter and receiver units for connection to first and second pairs of telephone lines interconnectable through a telephone exchange system, said transmitter unit including a line circuit for establishing a low impedance connection between the first pair of telephone lines and for receiving a dial tone signal back from the exchange system, a memory in said transmitter unit for storing information identifying said receiver unit and for storing a code word unique to said transmitter unit, a clock circuit for supplying signals to said memory, dialing means in said transmitter unit controllable from said memory for transmitting dial signals through the first pair of telephone lines to the exchange system, means responsive to receipt of a dial tone signal for applying clock signals from said clock circuit to said memory and transmission of said dial signals to the exchange system, a line circuit in said receiver unit for responding to a ring signal applied through the second pair of lines from the exchange system and for establishing a connection to the second pair of lines and to thereby complete a connection between said transmitter and receiver units through the telephone lines and the exchange system for signal transmission therebetween, means in said receiver unit for transmitting a request data tone signal following the establishment of said completed connection, request data tone detector means in said transmitter unit for detecting a request data tone signal transmitted back from said receiver unit through said completed connection, code signal transmission means in said transmitter unit controllable from said memory for transmitting keyed signals to said receiver unit through said completed connection, means responsive to detection of a request data tone signal by said detector means for applying clock signals from said clock circuit to said memory and transmission of said keyed signals to said receiver unit through said completed connection, signal receiving means in said receiver unit arranged for responding to said transmitted keyed signals to develop output signals, and means for applying said output signals to display means to display said code word unique to said transmitter unit.

2. In a telephone alarm system, transmitter and receiver units for connection to first and second pairs of telephone lines interconnectable through a telephone exchange system, said transmitter unit including a line circuit for establishing a low impedance connection between the first pair of telephone line and for receiving a dial tone signal back from the exchange system, dialing means in said transmitter unit responsive to receipt of a dial tone signal for transmitting dial signals through the first pair of telephone lines to the exchange system, a line circuit in said receiver unit for responding to a ring signal applied through the second pair of lines from the exchange system and for establishing a connection to the second pair of lines and to thereby complete a connection between said transmitter and receiver units through the telephone lines and the exchange system for signal transmission therebetween, means in said receiver unit for transmitting a request data tone signal following the establishment of said completed connection, request data tone detector means in said transmitter unit for detecting a request data tone signal transmitted back from said receiver unit through said completed connection, a memory in said transmitter unit for storing a code word unique to said transmitter unit, code signal transmission means in said transmitter unit controlled from said request data tone detector means and from said memory for transmitting keyed signals to said receiver unit through said completed connection, signal receiving means in said receiver unit arranged for responding to said transmitted keyed signals to develop output signals, and means for applying said output signals to display means to display said code word unique to said transmitter unit, said memory being operative to store coded word information in the form of a plurality of word groups each including a plurality of bits and said memory having output terminals on which a plurality of signal voltages are simultaneously developed corresponding to said plurality of bits of each word group, a clock circuit in said transmitter unit, said code signal transmission means in said transmitter unit including a converter circuit having input terminals coupled to said clock circuit and to said output terminals of said memory and arranged to develop serial trains of pulses with the number of pulses in each train corresponding to signal voltages simultaneously developed in said group of output terminals of said memory, and a keying circuit in said transmitter unit responsive to each of said serial trains of pulses and arranged to apply a corresponding serial train of keyed signals through said completed connection to the receiver unit.

3. In a system as defined in claim 2, said signal receiving means in said receiver unit including means responsive to transmitted keyed signals to produce serial trains of pulses corresponding to those produced by said converter circuit in said transmitter unit, and converter means in said receiver unit having a plurality of output terminals and responsive to each train of pulses to produce voltage signals on said output lines corresponding to the bits of the word group in the transmitted information.

4. In a telephone alarm system, transmitter and receiver units for connection to first and second pairs of telephone lines interconnectable through a telephone exchange system, said transmitter unit including a line circuit for establishing a low impedance connection between the first pair of telephone lines and for receiving a dial tone signal back from the exchange system, dialng means in said transmitter unit repsonsive to receipt of a dial tone signal for transmitting dial signals through the first pair of telephone lines to the exchange system, a line circuit in said receiver unit for responding to a ring signal applied through the second pair of lines from the exchange system and for establishing a connection to the second pair of lines and to thereby complete a connection between said transmitter and receiver units through the telephone lines and the exchange system for signal transmission therebetween, means in said receiver unit for transmitting a request data tone signal following the establishment of said completed connection, request data tone detector means in said transmitter unit for detecting a request data tone signal transmitted back from said receiver unit through said completed connection, a memory in said transmitter unit for storing a code word unique to said transmitter unit, code signal transmission means in said transmitter unit controlled from said request data tone detector means and from said memory for transmitting keyed signals to said receiver unit through said completed connection, signal receiving means in said receiver unit arranged for responding to said transmitted keyed signals to develop output signals, and means for applying said output signals to display means to display said code word unique to said transmitter unit, a parity latch circuit in said receiver unit operated from an unlatched condition to a latched condition in response to operation of said request data tone transmitter means, means in said signal receiving means for operating said parity latch circuit to said unlatched condition in response to performance of a satisfactory pariy check with respect to said received keyed signals, and means operative following the end of receipt of keyed signals for reinstituting operation of said request data tone transmission means when said parity latch circuit then remains in said latched condition.

5. In a system as defined in claim 4, said request data tone dectector means and said code signal transmission means in said transmitter unit being arranged to respond to retransmission of a request data tone through said completed connection for re-transmitting said keyed signals through said completed connection.

6. In a system as defined in claim 5, an enable latch circuit in said transmitter unit arranged to be activated from an unlatched condition to a latched condition in response to an alarm signal, an on-line loop circuit coupled to said enable latch circuit and including timer means operable for a predetermined time interval after activation, means activating said timer means in response to placing of said enable latch circuit in a latched condition, means responsive to activation of said enable latch circuit to said latched condition and to activation of said timer means for operating said line circuit to establish said low impedance connection, means coupling said request data tone detector to said enable latch circuit to activate said enable latch circuit to said unlatched condition in response to detection of a request data tone signal, and means operative at the end of said predetermined time interval and following activation of said enable latch circuit to said unlatched condition to operate said line circuit to an off-line condition.

7. In a transmitter unit for a telephone alarm system, a line circuit for connection to a pair of telephone lines, a memory circuit for storing code word information uniquely associated with said transmitter unit, said code word information being in the form of a plurality of word groups each including a plurality of bits and said memory circuit having output terminals on which a plurality of signal voltages are simultaneously developed corresponding to said plurality of bits of each word group, a clock circuit, a converter circuit having input terminals coupled to said clock circuit and to said output terminals of said memory circuit and arranged to develop serial trains of pulses with the number of pulses in each train corresponding to signal voltages simultaneously developed on said group of output terminals of said memory circuit, a keying circuit responsive to each of said serial trains of pulses and arranged to apply a corresponding serial train of keyed signals through said line circuit to the telephone lines, and control means for responding to an alarm condition and controlling operation of said memory and converter circuits and the application of said serial trains of keyed signals through said line circuit to the telephone lines.

8. In a transmitter unit as defined in claim 7, address means coupled to said clock circuit and to said memory circuit for successively developing signal voltages on said memory output terminals corresponding to successive word groups of stored information, and strobe means coupled to said clock circuit for controlling operation of said converter circuit in timed relation to the operation of said address means.

9. In a transmitter unit as defined in claim 7, said control means comprising a request data tone detector arranged to detect a tone of a predetermined frequency transmitted from the telephone lines through said line circuit and to develop a corresponding output signal, and request data control means responsive to said request data tone detector output signal for initiating operation of said memory, converter and keying circuits to cause transmission of serial trains of keyed signals through said line circuit to the telephone lines.

10. In a transmitter unit as defined in claim 9, said request data control means including a latch circuit operable from an unlatched condition to a latched condition in response to said request data tone detector output signal, and end of transmission detector means responsive to a predetemined code signal of said memory circuit output terminals for operating said latch circuit from said latched condition to said unlatched condition.

11. In a transmitter unit as defined in claim 7, said memory circuit being arranged for storing additional word groups of bits of information with the word groups corresponding to digits of a telephone number assigned to a receiver unit and said memory circuit having a second group of output lines on which an additional plurality of signal voltages are simultaneously developed corresponding to bits of each of said additional word groups of information, and dialing means controlled from said additional plurality of output lines for applying dialing signals through said line circuit to the telephone lines, said control means being operative for controlling said dialing means for initially applying said dialing signals to the telephone lines and for thereafter applying said serial trains of keyed signals through said line circuit to the telephone lines.

12. In a transmitter unit as defined in claim 11, said dialing means comprising counter means responsive to clock signals from said clock circuit and coupled to said additional plurality of output lines of said memory circuit for counting until the number of pulses applied correspond to a word group of information presented by signals on said additional plurality of output lines, means for applying clock pulses counted by said counter means through said line circuit to the telephone lines, and address means for controlling said memory after said counter means counts a number of pulses corresponding to one word group to develop signal voltages on said additional output terminals corresponding to a successive word group.

13. In a transmitter unit as defined in claim 11, said converter circuit having input terminals coupled both to said group of output terminals corresponding to said word groups of coded information and said additional output terminals corresponding to digits of a telephone number assigned to a receiver unit for developing serial trains of pulses with the number of pulses in each train corresponding to both groups of information.

14. In a transmitter unit as defined in claim 7, said keying circuit being arranged to develop keyed signals in the form of signals shifted between two tones of different frequencies.

15. In a transmitter unit for a telephone alarm system, a line circuit for connection to a pair of telephone lines, a memory circuit for storing bits of information in word groups, each word group corresponding to a digit of a telephone number of a receiving unit, said memory circuit having a group of output lines on which a plurality of signal voltages are simultaneously developed corresponding to bits of a presented word group, a clock circuit for supplying clock signals, dialing means comprising counter means responsive to clock signals from said clock circuit and coupled to said group of output lines to count until the number of applied clock pulses corresponds to the word group of information presented by signals on said group of output lines, means for applying clock pulses counted by said counter means through said line circuit to the telephone lines, address means for operating said memory circuit after said counter means counts a number of pulses corresponding to one word group to develop signal voltages on said output lines corresponding to a successive word group, and control means for responding to an alarm condition to control said memory circuit and said dialing means.

16. In a transmitter unit as defined in claim 15, said memory circuit being arranged to store bits of information forming a final end of data code word, and means responsive to development of signal voltages on said memory circuit output lines corresponding to said end of data code word for placing said memory circuit in an initial condition in which the first word group thereafter presented is that corresponding to the first digit of the telephone number of a receiver unit.

17. In a transmitter unit for a telephone alarm system, a line circuit for connection to a pair of telephone lines connected to a telephone exchange system, said line circuit being operative from an off-line condition to an on-line condition for establishing a low impedance connection between the telephone lines and for receipt and transmission of signals from and to the telephone lines, a dial tone detector circuit coupled through said line circuit to the telephone lines, dialing means controlled from said dial tone detector circuit for transmission of dial signals through said line circuit and the telephone lines for establishing a connection to a receiver unit through the exchange system, a request data tone detector circuit for receiving a request data tone signal transmitted back from a receiver unit, data transmission means controlled from said request data tone detector circuit for transmission of data through said line circuit, the telephone lines and the exchange system to a receiving unit, an enable latch circuit arranged to be activated from an unlatched condition to a latched condition in response to an alarm singal, an on-line loop circuit coupled to said enable latch circuit and including timer means operable for a predetermined time interval after activation, means for activating said timer means in response to placing of said enable latch circuit in a latched condition, means responsive to activation of said enable latch circuit to said latched condition and activation of said timer means for operating said line circuit to said on-line condition, means coupling said request data tone detector to said enable latch circuit to activate said enable latch circuit to said unlatched condition in response to detection of a request data tone signal, and means operative at the end of said predetermined time interval and following activation of said enable latch circuit to said unlatched condition to operate said line circuit to said off-line condition.

18. In a transmitter unit as defined in claim 17, means operative at the end of said predetermined time interval and when said enable latch circuit remains in said latched condition for temporarily placing said line circuit in said off-line condition and then re-activating said timer means for activation of said line circuit to said on-line condition.

19. In a transmitter unit as defined in claim 17, means for resetting and re-activating said timer means in response to receipt of a request data tone signal to operate for said predetermined time interval thereafter.

20. In a transmitter unit as defined in claim 17, said on-line loop circuit comprising a counter, and an on-line clock circuit for supplying clock signals to said counter.

21. In a receiver unit for a telephone alarm system, a line circuit for connection to a pair of telephone lines and including means responsive to an applied ring signal and means for thereafter establishing a connection to the telephone lines for transmission and receipt of signals to and from a transmitter unit, means for transmitting a request data tone signal through said connection, means for receiving keyed signals transmitted back from a transmitter unit through said connection, means responsive to received keyed signals to produce serial trains of pulses each train corresponding to at least one word group of bit information with each word group corresponding to a character of a transmitted code word uniquely identifying a transmitter unit, converter means having a plurality of output terminals and responsive to each train of pulses to simultaneously produce voltage signals on said output lines corresponding to the bits of the word group in the transmitted information and means for applying said voltage signals to display means to display the characters of the transmitted code word.

22. In a receiver unit as defined in claim 21, a parity latch circuit operated from an unlatched condition to a latched condition in response to operation of said request data tone transmitting means, means for operating said parity latch circuit to said unlatched condition in response to performance of a satisfactory parity check with respect to received keyed signals, and means operative following the end of receipt of keyed signals for re-instituting operation of said request data tone transmission means when said parity latch circuit then remains in said latched condition.

* * * * *